United States Patent [19]
Klarlund et al.

[11] Patent Number: 6,125,376
[45] Date of Patent: *Sep. 26, 2000

[54] METHOD AND APPARATUS FOR VOICE INTERACTION OVER A NETWORK USING PARAMETERIZED INTERACTION DEFINITIONS

[75] Inventors: Nils Klarlund, Chatham, N.J.; James Christopher Ramming, Menlo Park, Calif.

[73] Assignee: AT&T Corp, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/835,911

[22] Filed: Apr. 10, 1997

[51] Int. Cl.[7] .................................................. G06T 17/00
[52] U.S. Cl. ........................................................ 707/513
[58] Field of Search ....................................... 707/513, 531, 707/501, 502, 503; 379/88, 89, 108

[56] References Cited

U.S. PATENT DOCUMENTS

| | | | |
|---|---|---|---|
| 5,442,771 | 8/1995 | Filepp et al. ............................ | 707/501 |
| 5,614,927 | 3/1997 | Gifford et al. ........................... | 707/531 |

FOREIGN PATENT DOCUMENTS

| | | |
|---|---|---|
| 4440598 | 5/1996 | Germany . |
| WO97/23973 | 7/1997 | WIPO . |
| WO98/21872 | 5/1998 | WIPO . |

OTHER PUBLICATIONS

"The Laureate Text–to–speech System—Architecture and Application", by J. H. Page et al., BT Technology Journal, vol. 14, No. 1, Jan. 1, 1996, pp. 57–67, XP 005546329, ISSN: 0265–0193.

"Integrated Web and Telephone Service Creation", by D. L. Atkins et al., Bell Labs Technical Journal, vol. 2, No. 1, Jan. 1, 1997, pp. 19–35, XP002036350, ISSN: 1089–7089.

*JavaScript: The Definitive Guide,* Second Edition, David Flanagan, O'Reilly & Associates, Inc., Jan. 1997, p. 612.

*Computer Telephony and the Internet,* Dave Krupinski, Stylus Products Group, Cambridge, MA, 1996, pp. 1–13.

http://www/.sun.com/smi/Press/sunflash/9512/sunflash.951204.6754.html.

http://www.netphonic.com/info/onepage.html.

http://www.netphonic.com/info/company.html.

http://www.netphonic.com/info/pr960304.html.

http://www.netphonic.com/info/converil.html.

http://www.netphonic.com/info/alloneil.html.

*Primary Examiner*—Mark R. Powell
*Assistant Examiner*—Cliff N. Vo

[57] ABSTRACT

An audio browsing adjunct executes a voice markup language browser. The audio browsing adjunct receives a voice interactive request. Based on the request, the network node obtains a document. The document includes a voice markup, and a parameterized interaction definition or at least one link to a parameterized interaction definition when user interaction is required. The audio browsing adjunct interprets the document in accordance with the parameterized interaction definition. By using the parameterized interaction definition, entered data is typically verified at the audio browsing adjunct instead of at a network server. Further, the parameterized interaction definition can define a finite state machine. When it does, the parameterized interaction definition can be analyzed so that performance problems of the audio browsing adjunct are minimized.

20 Claims, 5 Drawing Sheets

FIG. 2

200  <INTERACTION TYPE=interaction_type NAME=interaction_name [ASR] [TT] [REC]>

202  <ATTRIBUTES paramname [=default_value]
                . . .
                paramname [=default_value]>

204  <MESSAGE msg_name>...</Message>
. . .
206  <COUNTER counter_name=initial_value>
. . .
208  <BOOLEAN boolean_variable=initial_value>

210  <STATE>
     [action |
      conditional_expr]

212  </STATE>
. . .
214  </INTERACTION>

FIG. 3A

```
300  <INTERACTION TYPE="menu"NAME='menudefault"TT>
302  <ATTRIBUTES
     TIMEOUT="3"
     PROMPTDELAY="1.5"
     HESITATIONDELAY="2"
     INACTIVITYTIME="10"
     RESETTT="*"
     HELPTT="##"
     MAXTTERROR="3"
     MAXTO=2">

304  <COUNTER TTERRCOUNT="MAXTTERROR">
306  <COUNTER TOCOUNT="MAXTO">

308  <MESSAGE HESITATION>
         <ENUM><SAY VALUE=MENUNO>: <SAY
     VALUE=MENUITEM></ENUM>
     </MESSAGE>

310  </MESSAGE HELP>
     There are <SAY VALUE=MENULENGTH>choices.
     <ENUM> To Select <SAY VALUE=MENUITEM>, press <SAY
     VALUE=MENUNO>.<ENUM>
     To obtain this help message, press<SAY VALUE=HELPTT>.
     </MESSAGE>

312  <MESSAGE ECHOCHOISE>
         <SAY VALUE=MENULASTCHOICE> Press<SAY
         VALUE=RESETT> to cancel.
     </MESSAGE>

314  <MESSAGE NOTVALIDTTMSG> This key combination doesn't make
     sense.</MESSAGE>

316  <MESSAGE MAXTERRORMSG> Too many errors. </MESSAGE>

318  <MESSAGE MAXTOERRORMSG> Sorry we didn't recognize any
     input. </MESSAGE>
```

FIG. 3B

```
320  <STATE NAME="initial">
        <MESSAGE PROMPT>
        <MODES> <TT> <TTMENU>
        <EVENTS>
            <TTMENU COLLECT STATE="echochoice">
            <TT INPUT="HELPTT" STATE="help">
            <TTFAIL DECREMENT=TTERRCOUNT
     STATE="notvalid">
        <TIMEOUT TIME="INACTIVITYTIME" DECREMENT=TOCOUNT
        STATE="inactivity">
        </EVENTS>

322  <STATE NAME="hesitate">
        <MESSAGE HESITATE DELAY=HESITATIONDELAY>
        <MODES> TT> TTMENU>
        <EVENTS>
            <TTMENU COLLECT STATE="echochoice">
            <TT INPUT="HELPTT" STATE="help"
            <TTFAIL DECREMENT=TTERRCOUNT STATE="notvalid">
            <TIMEOUT TIME="INACTIVITYTIME" STATE="inactivity">
        </EVENTS>

324  <STATE NAME="inactivity">
         <IF EQO="TOCOUNT">
            <MESSAGE MAXTORRORMSG>
            <NEW RESET>
         <ELSE>
            <MESSAGE INACIVIVTY>
            <MODES> TT> ttmenu>
            <EVENTS>
                <TTMENU COLLECT STATE="echochoice">
                <TT INPUT="HELPTT" STATE="help">
                <TTFAIL DECREMENT=TTERRCOUNT STATE="notvalid">
                <TIMEOUT TIME="INACTIVITYTIME"
                DECREMENT=TOCOUNT STATE="inactivity">
                <EVENTS>
         </IF>
```

FIG. 3C

```
326    <STATE NAME='echochoice">
       <MESSAGE ECHOCHOICE>
       <MODES> <TT>
       <EVENTS>
           <TT INPUT="RESETTT RESET STATE="reset">
           <TT INPUT="HELPTT" STATE=help">
           <TTFAIL DECREMENT-TTERRCOUNT STATE="notvalid">
           <TIMEOUT TIME="CONFIRMTIME" DECREMENT=TOCOUNT
           STATE="inactivity">
       </EVENTS>

328    <STATE NAME="notvalid">
       <IF EQO="TTERRORCOUNT">
           <MESSAGE MAXTERRORMSG>
           <NEW RESET>
       <ELSE>
           <MESSAGE NOTVALIDTTMSG>
           <NEW STATE="hesitate">
       </IF>

330    <STATE NAME="help">
       <MESSAGE HELPTT>
       <NEW STATE="hesitate">

332    </INTERACTION>
```

METHOD AND APPARATUS FOR VOICE INTERACTION OVER A NETWORK USING PARAMETERIZED INTERACTION DEFINITIONS

FIELD OF THE INVENTION

The present invention is directed to voice interaction over a network. More particularly, the present invention is directed to voice interaction over a network utilizing parameterized interaction definitions.

BACKGROUND OF THE INVENTION

The amount of information available over communication networks is large and growing at a fast rate. The most popular of such networks is the Internet, which is a network of linked computers around the world. Much of the popularity of the Internet may be attributed to the World Wide Web (WWW) portion of the Internet. The WWW is a portion of the Internet in which information is typically passed between server computers and client computers using the Hypertext Transfer Protocol (HTTP). A server stores information and serves (i.e. sends) the information to a client in response to a request from the client. The clients execute computer software programs, often called browsers, which aid in the requesting and displaying of information. Examples of WWW browsers are Netscape Navigator, available from Netscape Communications, Inc., and the Internet Explorer, available from Microsoft Corp.

Servers, and the information stored therein, are identified through Uniform Resource Locators (URL). URL's are described in detail in Berners-Lee, T., et al., *Uniform Resource Locators*, RFC 1738, Network Working Group, 1994, which is incorporated herein by reference. For example, the URL http://www.hostname.com/document1.html identifies the document "document1.html" at host server "www.hostname.com". Thus, a request for information from a host server by a client generally includes a URL. The information passed from a server to a client is generally called a document. Such documents are generally defined in terms of a document language, such as Hypertext Markup Language (HTML). Upon request from a client, a server sends an HTML document to the client. HTML documents contain information that is interpreted by the browser so that a representation can be shown to a user at a computer display screen. An HTML document may contain information such as text, logical structure commands, hypertext links, and user input commands. If the user selects (for example by a mouse click) a hypertext link from the display, the browser will request another document from a server.

Currently, most WWW browsers are based upon textual and graphical user interfaces. Thus, documents are presented as images on a computer screen. Such images include, for example, text, graphics, hypertext links, and user input dialog boxes. Most user interaction with the WWW is through a graphical user interface. Although audio data is capable of being received and played back at a user computer (e.g. a .wav or .au file), such receipt of audio data is secondary to the graphical interface of the WWW. Thus, with most WWW browsers, audio data may be sent as a result of a user request, but there is no means for a user to interact with the WWW using an audio interface.

An audio browsing system is disclosed in U.S. patent application Ser. No. 08/635,601, assigned to AT&T Corp. and entitled *Method and Apparatus for Information Retrieval Using Audio Interface*, filed on Apr. 22, 1996, incorporated herein by reference (hereinafter referred to as the "AT&T audio browser patent"). The disclosed audio browsing system allows a user to access documents on a server computer connected to the Internet using an audio interface device.

In one embodiment disclosed in the AT&T audio browser patent, an audio interface device accesses a centralized audio browser that is executed on an audio browsing adjunct. The audio browser receives documents from server computers that can be coupled to the Internet. The documents may include specialized instructions that enable them to be used with the audio interface device. The specialized instructions typically are similar to HTML. The specialized instructions may cause the browser to generate audio output from written text, or accept an input from the user through DTMF tones or automated speech recognition.

A problem that arises with an audio browsing system that includes a centralized browser is that the input of user data often requires a complex sequence of events involving the user and the browser. These events include, for example: a) prompting the user for input; b) enumerating the input choices; c) prompting the user for additional input; and d) informing the user that a previous input was wrong or inconsistent. We have found that it is desirable to program and customize the centralized browser in order to define the allowed sequences of events that can occur when the user interacts with the browser. However, when programming and customizing the browser, it is important to minimize certain performance problems that result from both inadvertently erroneous and malicious programming.

One such problem is that a browser that has been customized can become unresponsive if the customization contains, for example, an infinite loop. In addition to reducing the performance of the browser, to the detriment of other activity being performed by the browser, such a loop could allow a telephone call to extend over more time, disadvantageously adding to the cost of the call while at the same time potentially denying other callers access to the browser.

Another problem, known as a "denial of service" attack, is easier for the attacker to execute if the browser is customized in a way that allows a caller to keep the call connected without offering any input.

Some of these performance problems are less important in the context of non-centralized browsers, because non-centralized browsers that have been poorly customized typically affect only the computer that is executing the browser and the computer's telephone lines, and therefore programming errors are effectively quarantined.

However, in the centralized browser embodiment of the audio browsing system disclosed in the AT&T audio browser patent, and in any centralized browser, when the audio browsing adjunct that is executing the centralized browser incurs performance problems, the negative effects of the problems are exacerbated. In an audio browsing system, multiple users access the same audio browsing adjunct through multiple audio interface devices and thus many users are negatively affected when the audio browsing adjunct incurs performance problems. Therefore, it is desirable in an audio browsing system to minimize performance problems.

Another problem with most known browsers is that data entered on the browser at the client computer is typically sent to the server where verification and validation of the data is performed. For example, if a user enters data through a keyboard into a computerized fill-in form on a browser, that data is typically sent to the Internet server where it is verified that the form was properly filled out (i.e., all required information has been entered, the required number of digits have been entered, etc.). If the form was not properly filled out, the server typically sends an error message to the client, and the user will attempt to correct the errors.

However, in an audio browser system, frequently the data entered by the user is in the form of speech. The speech is converted to voice data or voice files using speech recognition. However, using speech recognition to obtain voice data is not as accurate as obtaining data through entry via a keyboard. Therefore, even more verification and validation of data when it is entered using speech recognition is required. Further, voice files converted from speech are typically large relative to data entered from a keyboard, and this makes it difficult to frequently send voice files from the audio browsing adjunct to the Internet server. Therefore, it is desirable to do as much verification and validation as possible of entered data at the browser in an audio browser system so that the number of times that the voice data is sent to the Internet server is minimized.

Based on the foregoing, there is a need for a audio browser system in which performance problems of the audio browsing adjunct executing the browser are minimized, and in which entered data is typically verified and validated at the browser instead of at the Internet server.

SUMMARY OF THE INVENTION

In accordance with one embodiment of the present invention, an audio browsing adjunct executes a voice markup language browser. The audio browsing adjunct receives a voice interactive request. Based on the request, the network node obtains a document. The document includes a voice markup, and, when user interaction is required, a parameterized interaction definition or at least one link to a parameterized interaction definition. The audio browsing adjunct interprets the document in accordance with the parameterized interaction definition.

By using the parameterized interaction definition, entered data is typically verified at the audio browsing adjunct instead of at a network server. Further, in one embodiment the parameterized interaction definition defines a finite state machine. In this embodiment, the parameterized interaction definition can be analyzed so that performance problems of the audio browsing adjunct are minimized.

BRIEF DESCRIPTION OF THE DRAWINGS

FIG. 2 illustrates the general form of a parameterized interaction definition.

FIGS. 3A, 3B and 3C are an example of a parameterized interaction definition.

DETAILED DESCRIPTION

Figure 1:
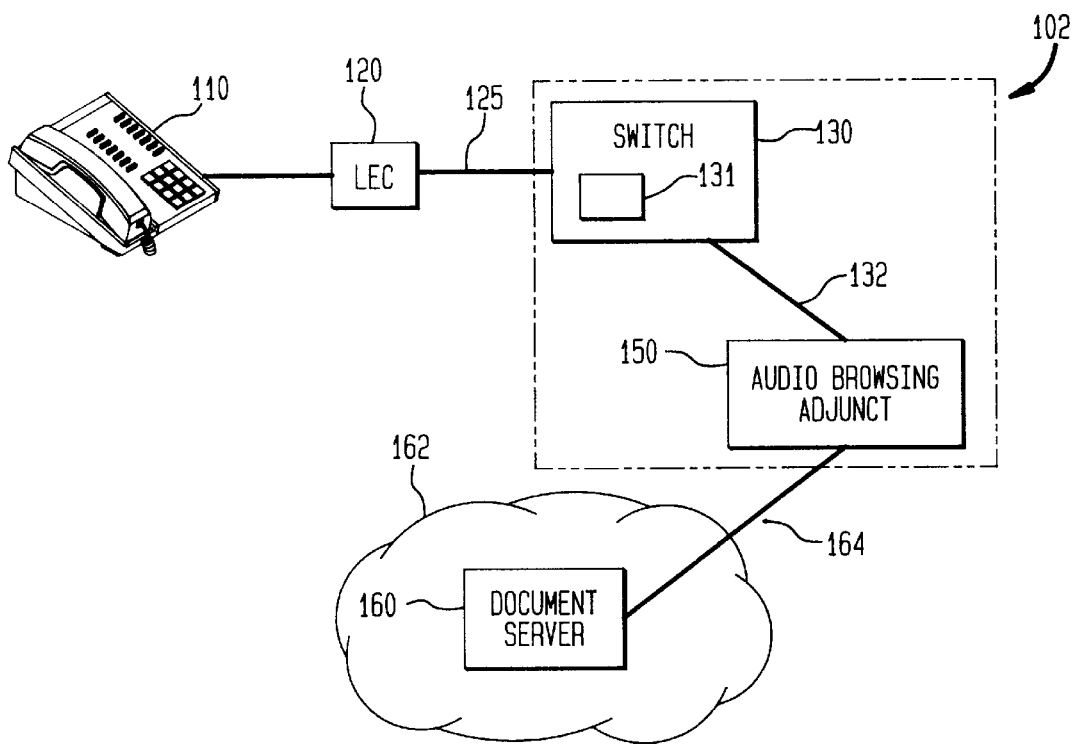
FIG. 1 shows a diagram of a telecommunications system which is suitable to practice one embodiment of the present invention.

FIG. 1 shows a diagram of a telecommunications system which is suitable to practice one embodiment of the present invention. An audio interface device, such as telephone 110, is connected to a local exchange carrier (LEC) 120. Audio interface devices other than a telephone may also be used. For example, the audio interface device could be a multimedia computer having telephony capabilities. In one embodiment, a user of telephone 110 requests information by placing a telephone call to a telephone number associated with information provided by a document server, such as document server 160. A user can also request information using any device functioning as an audio interface device, such as a computer.

In the embodiment shown in FIG. 1, the document server 160 is part of communication network 162. In an advantageous embodiment, network 162 is the Internet. Telephone numbers associated with information accessible through a document server, such as document server 160, are set up so that they are routed to special telecommunication network nodes, such as audio browsing adjunct 150.

In the embodiment shown in FIG. 1, audio browsing adjunct 150 is a node in telecommunications network 102 which is a long distance telephone network. Thus, the call is routed to the LEC 120, which further routes the call to a long distance carrier switch 130 via trunk 125. Long distance network 102 would generally have other switches similar to switch 130 for routing calls. However, only one switch is shown in FIG. 1 for clarity. It is noted that switch 130 in the telecommunications network 102 is an "intelligent" switch, in that it contains (or is connected to) a processing unit 131 which may be programmed to carry out various functions. Such use of processing units in telecommunications network switches, and the programming thereof, is well known in the art.

Upon receipt of the call at switch 130, the call is then routed to the audio browsing adjunct 150. Thus, there is established an audio channel between telephone 110 and audio browsing adjunct 150. The routing of calls through a telecommunications network is well known in the art and will not be described further herein.

Upon receipt of the call and the request from telephone 110, the audio browsing adjunct 150 establishes a communication channel with the document server 160 associated with the called telephone number via link 164. In a WWW embodiment, link 164 is a socket connection over TCP/IP, the establishment of which is well known in the art. For additional information on TCP/IP, see Comer, Douglas, *Internetworking with TCP/IP: Principles, Protocols, and Architecture*, Englewood Cliffs, N.J., Prentice Hall, 1988, which is incorporated by reference herein. Audio browsing adjunct 150 and the document server 160 communicate with each other using a document serving protocol. As used herein, a document serving protocol is a communication protocol for the transfer of information between a client and a server. In accordance with such a protocol, a client requests information from a server by sending a request to the server and the server responds to the request by sending a document containing the requested information to the server. Thus, a document serving protocol channel is established between audio browsing adjunct 150 and the document server 160 via link 164. In an advantageous WWW embodiment, the document serving protocol is the Hypertext Transfer Protocol (HTTP). This protocol is well known in the art of WWW communication and is described in detail in Berners-Lee, T. and Connolly, D., *Hypertext Transfer Protocol (HTTP) Working Draft of the Internet Engineering Task Force*, 1993, which is incorporated herein by reference.

Thus, the audio browsing adjunct 150 communicates with the document server 160 using the HTTP protocol. Thus, as far as the document server 160 is concerned, it behaves as if were communicating with any conventional WWW client executing a conventional graphical browser. Thus, the document server 160 serves documents to the audio browsing adjunct 150 in response to requests it receives over link 164. A document, as used herein, is a collection of information. The document may be a static document in that the document is pre-defined at the server 160 and all requests for that document result in the same information being served. Alternatively, the document could be a dynamic document, whereby the information which is served in response to a request is dynamically generated at the time the request is made. Typically, dynamic documents are generated by scripts, which are programs executed by the server 160 in response to a request for information. For example, a URL may be associated with a script. When the server 160 receives a request including that URL, the server 160 will execute the script to generate a dynamic document, and will serve the dynamically generated document to the client which requested the information. Dynamic scripts are typically executed using the Common Gateway Interface (CGI). The use of scripts to dynamically generate documents is well known in the art.

As will further be described below, in accordance with the present invention, the documents served by the server 160 include voice markups which are instructions that are interpreted by the audio browsing adjunct 150. In order to facilitate interaction between the user of the telephone 110 and audio browsing adjunct 150, in one embodiment the voice markups include links to parameterized interaction definitions. Details of parameterized interaction definitions will be described below. When the links are interpreted by the audio browsing adjunct 150, the appropriate parameterized interaction definitions are invoked. In another embodiment, the parameterized interaction definitions are included within the document.

In one embodiment, the voice markups and the parameterized interaction definitions are written in a language based on HTML but specially tailored for audio browsing adjunct 150. One example of HTML-like voice markup instructions is "audio-HTML", described in the AT&T audio browser patent.

When an HTML document is received by a client executing a conventional WWW browser, the browser interprets the HTML document into an image and displays the image upon a computer display screen. However, in the audio browsing system shown in FIG. 1, upon receipt of a document from document server 160, the audio browsing adjunct 150 converts some of the voice markup instructions located in the document into audio data in a known manner, such as using text to speech. Further details of such conversion are described in the AT&T audio browser patent. The audio data is then sent to telephone 110 via switch 130 and LEC 120. Thus, in this manner, the user of telephone 110 can access information from document server 160 via an audio interface.

In addition, the user can send audio user input from the telephone 110 back to the audio browsing adjunct 150. This audio user input may be, for example, speech signals or DTMF tones. The audio browsing adjunct 150 converts the audio user input into user data or instructions which are appropriate for transmitting to the document server 160 via link 164 in accordance with the HTTP protocol in a known manner. Further details of such conversion are described in the AT&T audio browser patent. The user data or instructions are then sent to the document server 160 via the document serving protocol channel. Thus, user interaction with the document server is via an audio user interface.

Parameterized interaction definitions are pre-defined routines that specify how input is collected from the user via the audio interface device 110 through prompts, feedbacks, and timeouts. The parameterized interaction definitions are invoked by specific voice markup instructions in documents when the documents are interpreted by the audio browser (referred to as the "voice markup language" (VML) browser) executing on the audio browsing adjunct 150. In one embodiment, the instructions define links to parameterized interaction definitions. The parameterized interaction definitions can be located within the document or elsewhere within the audio browsing system shown in FIG. 1 (e.g., at document server 160, at audio browsing adjunct 150, or at any other storage device coupled to audio browsing adjunct 150). In one embodiment, parameterized interaction definitions are stored on a database coupled to an interaction definition server. The interaction definition server is coupled to the VML browser so that the parameterized interaction definitions are available to the VML browser when requested. In addition, the parameterized interaction definitions may be part of the voice markup instructions, in which case a link is not required.

For example, a parameterized interaction definition may exist that enables a user to make one choice out of a list of menu options. This parameterized interaction definition might be entitled "MENU_INTERACT." If a document includes a section where such an interaction is required, a voice markup instruction can be written that invokes this interaction such as "Call MENU_INTERACT, parameter 1, parameter 2". This voice markup, when it is interpreted by the VML browser, would invoke the parameterized interaction definition entitled "MENU_INTERACT", and pass to it parameters 1 & 2.

The parameterized interaction definitions are what enable the present invention to achieve the previously described benefits (i.e., minimize performance problems of the audio browsing adjunct, and verify and validate entered data at the audio browsing adjunct instead of at the Internet server). The parameterized interaction definitions tailor and modify the behavior of the centralized audio browser to achieve these benefits.

Specifically, in one embodiment, the parameterized interaction definitions define finite state machines. It is well known that finite state machines can be completely analyzed before being executed using known techniques. The analysis can determine, for example, whether the parameterized interaction definition will terminate if the user does not hang up and does not offer any input. This prevents a user from tying up the VML browser indefinitely by doing nothing. Further, the analysis can determine if all sections or states of the parameterized interaction definition can be reached by the user. Further, the analysis can determine if the parameterized interaction definition includes sections or states that do not lead to an exit point, which would cause an infinite loop. These states can be revised or eliminated before the parameterized interaction definition is interpreted or executed by the VML browser or the audio browsing adjunct 150. Because of the availability of these analysis tools, a developer of an audio browser document that uses parameterized interaction definitions can be assured that disruptions to the browser will be minimized by implementing the analyzed interaction definitions when the document requires user interaction.

Further, the parameterized interaction definitions provide verification of the user's input. Therefore, because the parameterized interaction definitions are interpreted at the audio browsing adjunct 150, there is a minimal need for user input to be sent to the Internet server for verification. This saves time and telecommunication costs because user input frequently consists of relatively large voice files.

Examples of some of the possible types of parameterized interaction definitions include:

a) menu, where the user is to make one choice out of a list of menu options;

b) multimenu, where the user selects a subset of options;

c) text, where the user must provide a string of characters;

d) digits, where the user most provide sequence of digits, whose length is not determined a priori;

e) digitslimited, where the user must input a predetermined number of digits; and f) recording, where the user's voice is recorded to an audio file.

FIG. 2 illustrates the general form of a parameterized interaction definition.

Line 200 defines an interaction named "interaction_name" for interaction type "interaction_type." In addition line 200 declares all media that may be used in the interaction. The media declared in line 200 includes automatic speech recognition (ASR), touch tones or DTMF (TT), and recording (REC).

Line 202 defines a number of attribute parameters. Attribute parameters are used to parameterize the interaction and are included in the voice markup instruction that invoke the interaction. If no parameters are included in the voice markup instructions, a default value, "default_value" is used as the parameter.

Line 204 defines a number of message parameters. Message parameters can be used as formal placeholders within the state machine to accommodate prompts and messages specified when using the interaction. Message parameters are also used to parameterize the interaction and are included in the voice markup instruction that invoke the interaction.

Line 206 defines a number of counter variable declarations. Each counter is declared with an initial value. Operations allow this variable to be decremented from a fixed initial value (typically less than 10) and tested for 0.

Line 208 defines a number of Boolean variable declarations. Each Boolean variable is declared with an initial value.

Line 210 defines a number of state declarations. Each state contains one of the following constructs:

1) An action, which consists of a message synthesized into speech and code to change the state, either immediately or as a result of events enabled. Also specified are the input modes that are activated. For example, the input mode ttmenu, which is defined for interactions of type menu, specifies that events designating the choice of an option can occur as a result of the user entering a digit. Each event is mentioned in an event transition, which specifies the side-effects to be effectuated when the event occurs; or 2) A conditional expression, which allows the action to depend on the settings of variables. Thus a conditional expression consists of actions that are embedded in if-then-else constructs.

An interaction defined in the language previously described can be regarded as a finite-state machine whose total state space is the product of the current state and the values of the various variables.

FIGS. 3A, 3B and 3C are an example of a parameterized interaction definition. Referring to FIG. 3A, line 300 defines the interaction type as menu and a parameterized interaction name. Line 302 defines that attribute parameters. Lines 304 and 306 define counter variables. Lines 308, 310, 312 314, 316 and 318 indicate the beginning of message parameters.

Referring to FIG. 3B, lines 320, 322 and 324 indicate the beginning of various states.

Referring to FIG. 3C, lines 326, 328, 330 indicate the beginning of various states. Finally, line 332 indicates the end of the interaction definition.

More details of the "initial" state that begins on line 320 of FIG. 3B will be described. The other states shown in FIGS. 3B and 3C function similarly.

Initially, the state machine associated with the interaction is in state "initial" and the two counter variables TTERRCOUNT and TOCOUNT are initialized to MAXTTERROR and MAXTO, respectively. These values, if not explicitly overridden by parameters when the interaction definition is used, are 3 and 2, respectively. The state "initial" specifies that the message PROMPT (which is typically a parameter whose actual value is the text in the voice markup document preceding the use of the interaction) is to be synthesized while touchtone command mode (TT) and touchtone menu selection mode (TTMENU) are activated. These activations enable the events TTMENU COLLECT and TT INPUT= "HELPTT", respectively, to occur. The first kind of event denotes a digit input specifying a menu option selection. The second kind of event specifically refers to the input "HELPTT" (whose default is "##"). If an event of the first kind happens, then the next state of the finite-state machine will be "echochoice". If the second event occurs first, then the next state will be "help". If a meaningless touchtone occurs, then the event transition involving the event TTFAIL specifies that TTERRCOUNT is to be decremented and that the next state is "notvalid".

If none of these three events occur within a period of time designated by "INACTIVITYTIME", then event TIMEOUT happens, TTERRCOUNT is decremented, and the next state is "inactivity".

As described, the VML browser of the present invention interprets documents in accordance with parameterized interaction definitions. The parameterized interaction definitions enable an audio browsing system to minimize performance problems of the audio browsing adjunct, and verify entered data at the audio browsing adjunct instead of at an Internet server.

Further, the parameterized interaction definitions establish a dialog for the input of data into a field (i.e. the "HELPTT" field) where sequences of user input and system responses can be specific and controlled. Each user generated event such as a key press or a utterance by the user is controlled and responded to by the parameterized interaction definitions.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the audio browsing system shown in FIG. 1 executes the VML browser as a centralized browser at audio browsing adjunct 150. However, the present invention can also be implemented with other embodiments of an audio browsing system, including all embodiments disclosed in the AT&T audio browser patent.

What is claimed is:

1. A method of operating an audio browsing adjunct comprising the steps of:

obtaining a document comprising markup instructions and including at least one interaction definition, said interaction definition specifying an initial state, any message associated with the initial state; and a construct specifying what events will change the state;

interpreting the document in accordance with the markup instructions and the interaction definition, further comprising the steps of:

transmitting any message associated with the initial state to an audio interface device;

receiving audio user input from the audio interface device; and changing the initial state in accordance with the construct in the interaction definition.

2. The method of claim 1 wherein the audio browsing adjunct is in communication with the audio interface device across a public switched telephone network.

3. The method of claim 1 wherein the document is obtained from a server connected to a data network.

4. The method of claim 1 wherein the audio interface device is a telephone.

5. The method of claim 4 wherein the audio user input is a speech signal.

6. The method of claim 4 wherein the audio user input is a DTMF tone.

7. The method of claim 1 wherein the message is transmitted using automatic speech synthesis.

8. The method of claim 1 wherein the message is transmitted using pre-recorded audio.

9. The method of claim 1 further comprising the step of verifying the audio user input.

10. The method of claim 1 wherein the construct specifies what input modes are active.

11. An audio browsing adjunct comprising:

means for transmitting messages to an audio interface device;

means for receiving audio user input from the audio interface device;

means for obtaining a document comprising markup instructions and including at least one interaction definition, said interaction definition specifying an initial state, any message associated with the initial state; and a construct specifying what events will change the state;

means for interpreting the document in accordance with the markup instructions and the interaction definition.

12. The audio browsing adjunct of claim 11 wherein the audio browsing adjunct is in communication with the audio interface device across a public switched telephone network.

13. The audio browsing adjunct of claim 11 wherein the document is obtained from a server connected to a data network.

14. The audio browsing adjunct of claim 11 wherein the audio interface device is a telephone.

15. The audio browsing adjunct of claim 14 wherein the audio user input is a speech signal.

16. The audio browsing adjunct of claim 14 wherein the audio user input is a DTMF tone.

17. The audio browsing adjunct of claim 11 wherein the transmitting means uses automatic speech synthesis.

18. The audio browsing adjunct of claim 11 wherein the transmitting means uses pre-recorded audio.

19. The audio browsing adjunct of claim 11 further comprising means for verifying the audio user input.

20. The audio browsing adjunct of claim 11 wherein the construct specifies what input modes are active.

* * * * *